(12) United States Patent
Miyahara et al.

(10) Patent No.: US 8,896,190 B2
(45) Date of Patent: Nov. 25, 2014

(54) ELECTRIC APPARATUS WITH STATOR CORE

(75) Inventors: Akio Miyahara, Nagano (JP); Masaaki Oohashi, Nagano (JP); Hong Zhang, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 224 days.

(21) Appl. No.: 13/555,264

(22) Filed: Jul. 23, 2012

(65) Prior Publication Data

US 2013/0026887 A1   Jan. 31, 2013

(30) Foreign Application Priority Data

Jul. 26, 2011   (JP) .................. 2011-162851

(51) Int. Cl.
*H02K 1/18*        (2006.01)
*H02K 5/15*        (2006.01)

(52) U.S. Cl.
CPC ........................................ *H02K 5/15* (2013.01)
USPC .............................. 310/402; 310/405; 310/89

(58) Field of Classification Search
CPC ............ H02K 5/15; H02K 5/04; H02K 1/185
USPC ..................... 310/89, 90, 402, 405
See application file for complete search history.

(56) References Cited

U.S. PATENT DOCUMENTS

| 4,626,725 | A | * | 12/1986 | Kawada et al. | ................. 310/89 |
| 4,955,128 | A | * | 9/1990 | Sogabe et al. | ................. 29/596 |
| 5,068,556 | A | * | 11/1991 | Lykes et al. | ..................... 310/90 |
| 5,075,585 | A | * | 12/1991 | Teruyama et al. | ............. 310/89 |
| 6,133,661 | A | * | 10/2000 | Okawa et al. | ..................... 310/90 |
| 6,211,587 | B1 | * | 4/2001 | Enomoto et al. | ................. 310/52 |
| 6,518,687 | B2 | * | 2/2003 | Akutsu et al. | .......... 310/216.045 |
| 6,700,253 | B1 | * | 3/2004 | Ohnuma et al. | ................ 310/89 |
| 7,781,928 | B2 | * | 8/2010 | Yumoto et al. | ................. 310/89 |
| 8,446,056 | B2 | * | 5/2013 | Bradfield | ........................ 310/58 |

FOREIGN PATENT DOCUMENTS

JP   05-067188 U   9/1993
JP   2004-023854 A   1/2004

* cited by examiner

*Primary Examiner* — Thanh Lam
(74) *Attorney, Agent, or Firm* — Rankin, Hill & Clark LLP

(57) ABSTRACT

An electric apparatus with high performance and high rigidity is provided. Annular positioning stepped portions are formed at respective outer peripheral corner portions of both end portions of a stator core to extend entirely circumferentially of the stator core. An annular positioning projecting portion is formed at a first end bracket to be entirely fitted with one of the annular positioning stepped portions of the stator core. An annular positioning projecting portion is formed at a second end bracket to be entirely fitted with the other annular positioning stepped portion of the stator core.

9 Claims, 9 Drawing Sheets

ELECTRIC APPARATUS WITH STATOR CORE

TECHNICAL FIELD

The present invention relates to an electric apparatus including a stator core and an end bracket fitted with an end portion of the stator core.

BACKGROUND OF THE INVENTION

Figure 7:
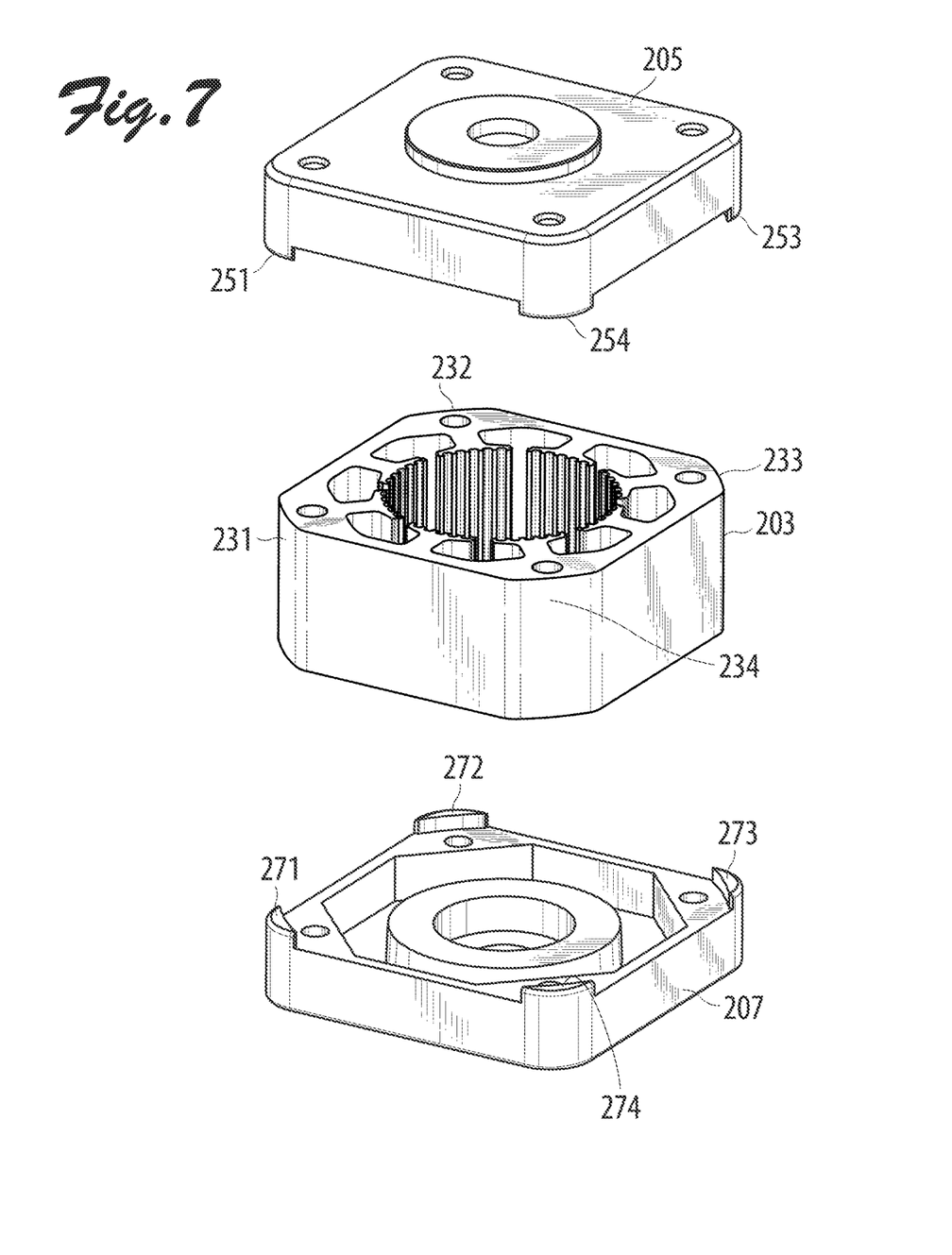
FIG. 7 is a perspective view as a conventional electric apparatus is partially exploded.

Japanese Patent Application Publication No. 2004-23854 (JP2004-023854A) discloses a motor including a stator core 203, a pair of end brackets 205 and 207 attached to both end portions of the stator core 203, and a rotor 209 configured to rotate inside the stator core 203. Four projecting portions 251 to 254 and 271 to 274 are formed respectively at four corners of the pair of end brackets 205 and 207. The projecting portions are fitted with four respective outer corners 231 to 234 and 235 to 238 of both end portions of the stator core 203 (see FIG. 7).

Figure 8:
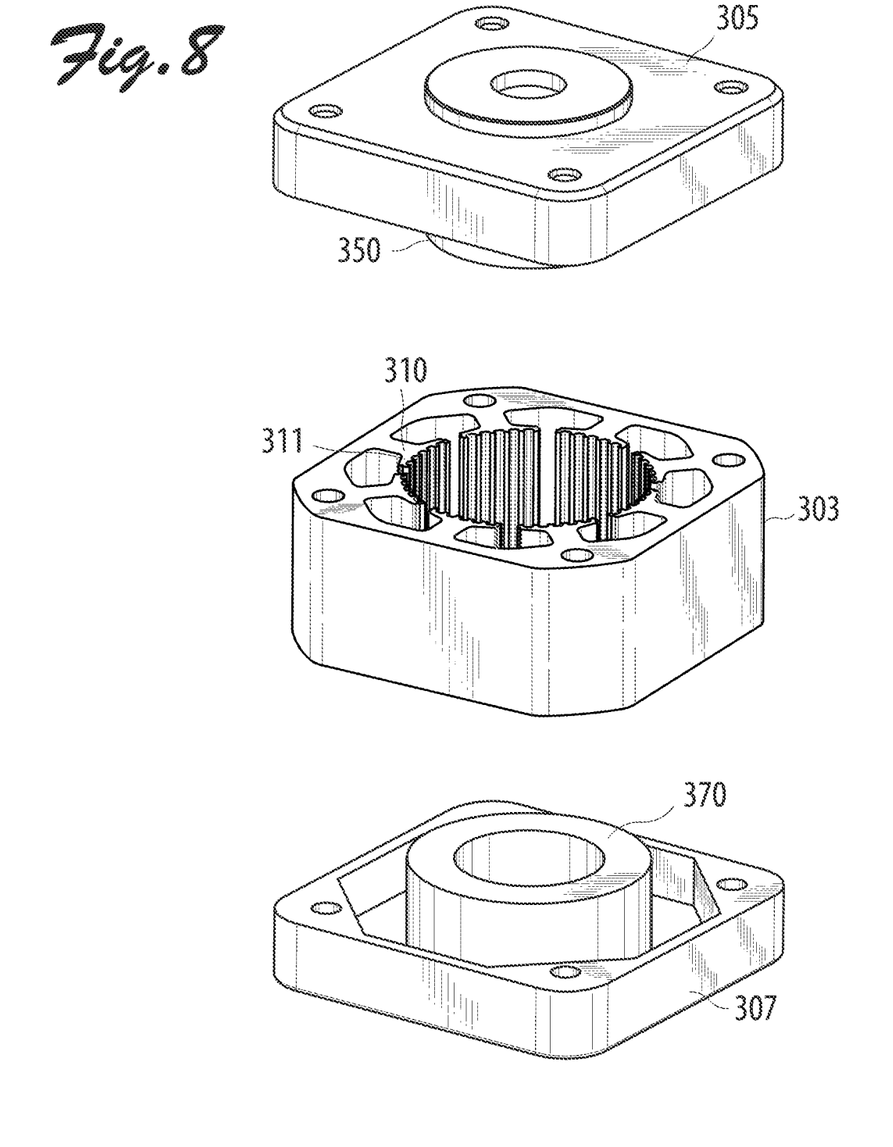
FIG. 8 is a perspective view as a conventional electric apparatus is partially exploded.

Japanese Utility Model Application Publication No. 05-67188 (JPU05-067188A) discloses a motor including a stator core 303, a pair of end brackets 305 and 307 attached to both end portions of the stator core 303, and a rotor configured to rotate inside the stator core 303. Cylindrical projecting portions 350 and 370 are formed at the pair of end brackets 305 and 307, respectively. A part of the cylindrical projecting portions 350 and 370 is fitted with a part of magnetic pole portions 310 (pole teeth 311) formed in the stator core 303 (see FIG. 8).

If the end brackets do not contact the magnetic pole portions (pole teeth) in the stator core as in the motor according to JP2004-023854A, the stator core and the rotor can face each other over a large area, which allows the motor to produce relatively high torque. With such a fitting structure, however, the stator core and the end brackets are fitted with each other only at several locations, which limits the rigidity of the motor and tends to cause vibration and noise from the motor.

If the projecting portions of the end brackets are fitted inside the stator core as in the motor according to JPU 05-067188 A, the stator core and the end brackets can contact each other over a large surface, which makes it possible to increase the rigidity of the motor and to reduce vibration and noise. With such a fitting structure, however, the projecting portions of the end brackets contact the magnetic pole portions (pole teeth) in the stator core, which reduces an area over which the stator core and the rotor face each other and accordingly reduces torque of the motor.

SUMMARY OF THE INVENTION

An object of the present invention is to provide an electric apparatus with high performance and high rigidity.

Another object of the present invention is to provide an electric apparatus that can be easily assembled.

The present invention aims at improvement of an electric apparatus including a stator core and an end bracket fitted with an end portion of the stator core. An outer peripheral corner portion is formed at the end portion of the stator core to provide a corner portion on the outer circumference of the end portion. One of an annular positioning stepped portion and an annular positioning projecting portion is formed at the outer peripheral corner portion of the stator core to extend over the entire outer circumference of the stator core.

The annular positioning stepped portion is formed annularly to be fitted with the annular positioning projecting portion, and configured to determine the positional relationship between the stator core and the end bracket. The annular positioning projecting portion projects annularly toward the end bracket to be fitted with the annular positioning stepped portion, and configured to determine the positional relationship between the stator core and the end bracket. The phrase "one of an annular positioning stepped portion and an annular positioning projecting portion" means that either one of the annular positioning stepped portion and the annular positioning projecting portion maybe formed at the end portion of the stator core.

The other of the annular positioning stepped portion and the annular positioning projecting portion is formed at the end bracket to be entirely fitted with the one of the annular positioning stepped portion and the annular positioning projecting portion. The phrase "the other of the annular positioning stepped portion and the annular positioning projecting portion" means that either one of the annular positioning stepped portion and the annular positioning projecting portion may be formed at the end bracket. If the annular positioning stepped portion is formed at the end portion of the stator core, the annular positioning projecting portion is formed at the end bracket. If the annular positioning projecting portion is formed at the end portion of the stator core, the annular positioning stepped portion is formed at the end bracket.

If the one of the annular positioning stepped portion and the annular positioning projecting portion formed at the end portion of the stator core is fitted with the other of the annular positioning stepped portion and the annular positioning projecting portion as in the present invention, an inner peripheral surface of the annular positioning stepped portion and an outer peripheral surface of the annular positioning projecting portion contact each other over the entire circumference between the stator core and the end bracket with the end bracket contacting an end surface of the end portion of the stator core when the end bracket is attached to the stator core. With such a fitting structure, the end portion of the stator core and the end bracket can contact each other over a large surface, thereby increasing the rigidity between the stator core and the end bracket. In addition, when the end bracket is attached to the end portion of the stator core, any part of the end bracket does not contact internal structural members such as magnetic pole portions of the stator core, thereby increasing an area of the surface over which the stator core (such as magnetic pole portions) and the rotor face each other. Therefore, according to the present invention, the performance of the electric apparatus can be enhanced compared to the related art.

If the annular positioning stepped portion is formed at the outer peripheral corner portion of the end portion of the stator core and the annular positioning projecting portion is formed at the end bracket, the end bracket preferably includes a bearing fixing portion and a cylindrical peripheral wall portion extending toward the stator core from an outer peripheral portion of the bearing fixing portion. In this configuration, a distal end portion of the cylindrical peripheral wall portion works as the annular positioning projecting portion. With such a fitting structure, the outer peripheral surface of the annular positioning projecting portion (cylindrical peripheral wall portion) of the end bracket contacts the inner peripheral surface of the annular positioning stepped portion of the stator core over the entire circumference with the end bracket contacting an end surface of the end portion of the stator core. Thus, when the annular positioning stepped portion is formed at the end portion of the stator core and the annular positioning projecting portion is formed at the end bracket, the fitting structure as discussed above may be provided between the stator core and the end bracket such that the stator core and the end bracket contact each other over a large surface and any part of the end bracket does not contact internal structural members such as magnetic pole portions of the stator core.

If the annular positioning projecting portion is formed at the outer peripheral corner portion of the end portion of the stator core and the annular positioning stepped portion is formed at the end bracket, the end bracket preferably includes a bearing fixing portion, and the annular positioning stepped portion is formed at an outer peripheral corner portion of the bearing fixing portion. With such a fitting structure, the inner peripheral surface of the annular positioning stepped portion of the end bracket contacts the outer peripheral surface of the annular positioning projecting portion of the stator core over the entire circumference with the end bracket contacting an end surface of the end portion of the stator core. Thus, when the annular positioning projecting portion is formed at the end portion of the stator core and the annular positioning stepped portion is formed at the end bracket, the fitting structure as discussed above may also be provided between the stator core and the end bracket such that the stator core and the end bracket contact each other over a large surface and any part of the end bracket does not contact internal structural members (such as magnetic pole portions) of the stator core.

If the stator core is formed by stacking a plurality of magnetic steel sheets, the annular positioning stepped portion or the annular positioning projecting portion provided at the stator core may be formed by stacking magnetic steel sheets which are shaped differently from magnetic steel sheets forming a main portion of the stator core. The main portion of the stator core corresponds to a portion of the stator core excluding the annular positioning stepped portion or the annular positioning projecting portion. That is, the main portion of the stator core includes magnetic pole portions, a yoke surrounding the magnetic pole portions, and so forth. If the annular positioning stepped portion is provided at the stator core, the magnetic steel sheets forming the annular positioning stepped portion are shaped to be stacked on an end surface of the yoke of the stator core to form a step between the annular positioning stepped portion and the end surfaces of the magnetic pole portions. If the annular positioning projecting portion is provided at the stator core, the magnetic steel sheets forming the annular positioning projecting portion are shaped to be stacked on the end surface of the yoke of the stator core to form a step between the annular positioning projecting portion and the end surface of the yoke.

Thus, the annular positioning projecting portion or the annular positioning stepped portion can be formed at the stator core even if the stator core formed by stacking a plurality of magnetic steel sheets is used. In addition, any part of the end bracket is not inserted into the stator core (any part of the end bracket does not contact the distal ends (pole teeth) of the plurality of magnetic poles formed inside the stator core) when the end bracket is fitted with the end portion of the stator core. Therefore, the surface area of the distal ends (pole teeth) of the plurality of magnetic poles of the stator core can be increased, thereby improving the performance (torque) of the electric apparatus including a rotary electric machine.

The annular positioning stepped portion and the annular positioning projecting portion of the stator core and the annular positioning stepped portion and the annular positioning projecting portion of the end bracket are preferably configured such that respective surfaces of the annular positioning stepped portion and the annular positioning projecting portion that contact each other in a radial direction are cylindrical surfaces. Thus, when the respective contact surfaces over which the stator core and the end bracket are fitted with each other are cylindrical surfaces, the end bracket can be positioned with respect to the stator core with increased accuracy. In addition, a gap between the stator core and the end bracket can be narrowed, thereby reducing vibration and noise produced in the gap.

The present invention having the fitting structure discussed above can be applied to a variety of electric apparatuses. For example, the present invention can be applied to a rotary electric machine such as a stepping motor including a stator core, a rotor having a rotary shaft and configured to rotate inside the stator core, and a pair of end brackets fitted with both end portions of the stator core to hold bearings for supporting the rotary shaft. In this case, one of an annular positioning stepped portion and an annular positioning projecting portion is formed at an outer peripheral corner portion of each end portion of the stator core to extend entirely circumferentially of the stator core, and the other of the annular positioning stepped portion and the annular positioning projecting portion is formed at each of the pair of end brackets to be entirely fitted with the one of the annular positioning stepped portion and the annular positioning projecting portion.

BRIEF DESCRIPTION OF THE DRAWINGS

These and other objects and many of the attendant advantages of the present invention will readily be appreciated as the same becomes better understood by reference to the following detailed description when considered in connection with the accompanying drawings.

DESCRIPTION OF THE PREFERRED EMBODIMENTS

Figure 1A:
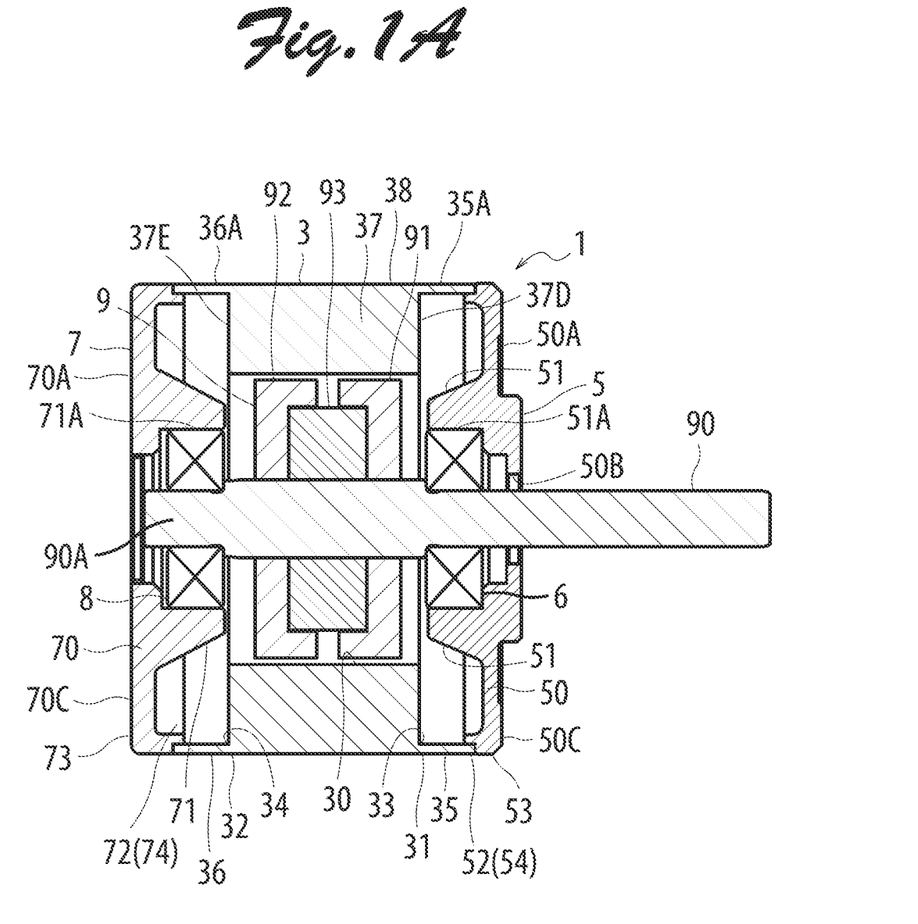
FIG. 1A is a cross-sectional view showing an electric apparatus according to a first embodiment of the present invention.
Figure 1B:
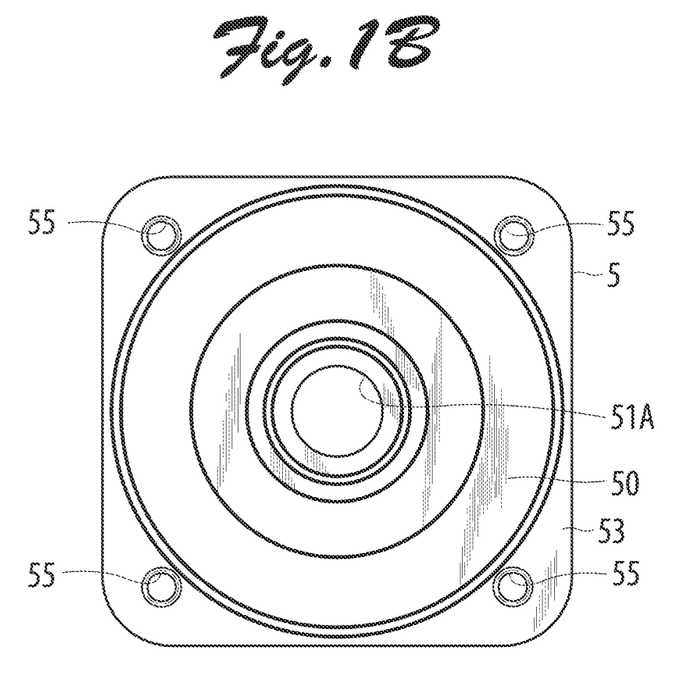
FIG. 1B is a plan view showing a part (a first end bracket) of the electric apparatus of FIG. 1A.
Figure 2:
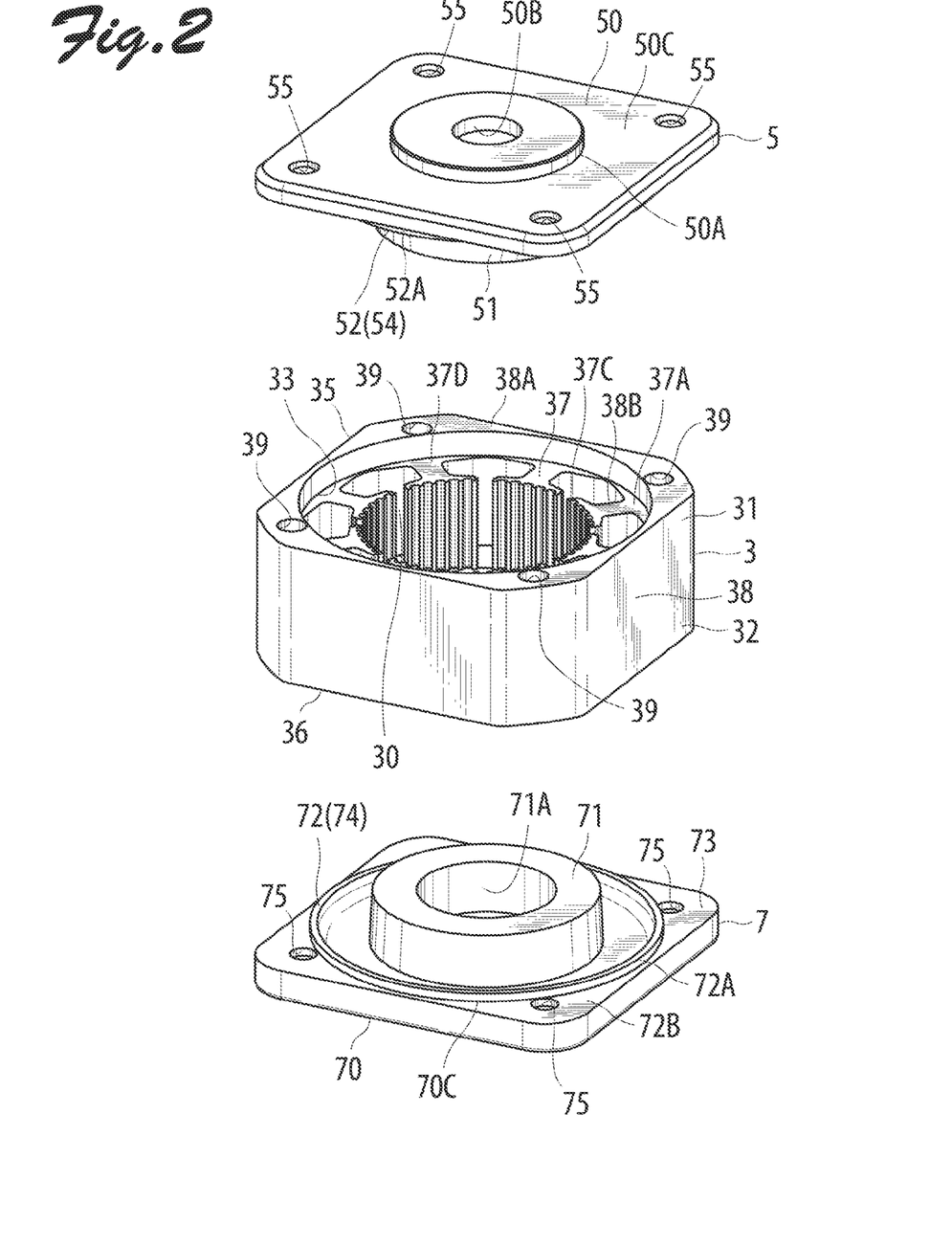
FIG. 2 is a perspective view as the electric apparatus of FIGS. 1A and 1B is partially exploded.

An embodiment of an electric apparatus according to the present invention, which is used in a stepping motor, a sort of a rotary electric machine, will now be described below. FIG. 1A is a cross-sectional view showing a stepping motor according to a first embodiment of the present invention. FIG. 1B is a plan view showing a part (a first end bracket) of the stepping motor of FIG. 1A. FIG. 2 is a perspective view showing some exploded parts (a stator core and a pair of end brackets) of the stepping motor of FIGS. 1A and 1B. As shown in FIGS. 1A, 1B, and 2, the stepping motor 1 includes a stator core 3, a pair of end brackets (a first end bracket 5 and a second end bracket 7), and a rotor 9. The stator core 3 is formed by stacking a plurality of magnetic steel sheets formed by punching. The stator core 3 is shaped to have a quadrangular profile as seen in a direction in which the stator core 3 faces the pair of end brackets 5 and 7 (see FIG. 1B). A through hole 30 is formed inside the stator core 3 such that a rotary shaft 90 of the rotor 9 passes through the through hole 30 to allow the rotor 9 to rotate. Outer peripheral corner portions 33 and 34 are formed at both end portions (a first end portion 31 and a second end portion 32) of the stator core 3, respectively, to provide corner portions on the outer circumferences of the both end portions 31 and 32.

Annular positioning stepped portions 35 and 36 are formed at the outer peripheral corner portions 33 and 34, respectively, of the stator core 3 to extend over the entire outer circumference of the stator core 3. The annular positioning stepped portions 35 and 36 are formed by stacking magnetic steel sheets which are shaped differently from magnetic steel sheets forming a main portion of the stator core 3 (magnetic pole portions 37 and a yoke 38 of the stator core 3 shown in FIG. 2). Specifically, the magnetic steel sheets for forming the annular positioning stepped portions 35 and 36 are shaped differently from the magnetic steel sheets for integrally forming the magnetic pole portions 37 (each including a base portion 37A, a pole column 37B, and a pole tooth 37C) which face the rotor 9 configured to rotate in the through hole 30 of the stator core 3, and the yoke 38 which surrounds the outer circumference of the magnetic pole portions 37. By separately stacking such differently shaped magnetic steel sheets, the magnetic pole portions 37 and the yoke 38 are integrally formed. Then, the annular positioning stepped portion 35 is formed at a first end portion 38A of the yoke 38 such that a step d1 is formed between the annular positioning stepped portion 35 and respective first end portions 37D of the magnetic pole portions 37, and the annular positioning stepped portion 36 is formed at a second end portion 38B of the yoke 38 such that a step d2 is formed between the annular positioning stepped portion 36 and respective second end portions 37E of the magnetic pole portions 37.

Screw holes 39 are formed at four corners of the stator core 3 (at four corners of each of the annular positioning stepped portions 35 and 36). Screws (not shown) are screwed into the screw holes 39 to attach the pair of end brackets 5 and 7 to the stator core 3.

The first end bracket 5 of the pair of end brackets includes a base portion 50, a bearing fixing portion 51, a cylindrical peripheral wall portion 52, and a flange portion 53. The end bracket 5 is attached to the first end portion 31 of the stator core 3. A through hole 50B is formed in a center portion 50A of the base portion 50 such that the rotary shaft 90 of the rotor 9 passes through the through hole 50B in a direction in which the stator core 3 and the first end bracket 5 face each other to allow the rotary shaft 90 to rotate.

The bearing fixing portion 51 includes an annular recessed portion 51A extending toward the stator core 3 from the center portion 50A of the base portion 50. A bearing 6 is fixed in the recessed portion 51A of the bearing fixing portion 51 to rotatably support the rotary shaft 90 of the rotor 9 with the first end bracket 5 attached to the stator core 3.

The cylindrical peripheral wall portion 52 includes a cylindrical wall portion 52A extending toward the stator core 3 from an outer peripheral portion 50C of the bearing fixing portion 51, and an outer end surface 52B located on the outer periphery of the wall portion 52A to form the step d1 between the outer end surface 52B and the wall portion 52A. In this embodiment, the distal end portion (wall portion 52A) of the cylindrical peripheral wall portion 52 forms the annular positioning projecting portion 54 to be fitted with the annular positioning stepped portion 35 of the stator core 3.

The flange portion 53 is formed at the outer peripheral portion 50C of the cylindrical peripheral wall portion 52. The profile of the flange portion 53 coincides with the profile of the first end bracket 5 (see FIG. 1B). Screw holes 55 are formed at four corners of the flange portion 53. The screw holes 55 correspond to the four screw holes 39 formed in the first end portion 31 of the stator core 3. The first end bracket 5 is attached to the stator core 3 by inserting screws (not shown) into the four screw holes 39 provided in the first end portion 31 of the stator core 3 and the four screw holes 55 provided in the flange portion 53 with the flange portion 53 contacting the first end portion 31 of the stator core 3.

The second end bracket 7 of the pair of end brackets includes a base portion 70, a bearing fixing portion 71, a cylindrical peripheral wall portion 72, and a flange portion 73. The second end bracket 7 is attached to the second end portion 32 of the stator core 3. The bearing fixing portion 71 is provided at a center portion 70A of the base portion 70.

The bearing fixing portion 71 includes an annular recessed portion 71A extending toward the stator core 3 from the center portion 70A of the base portion 70. A bearing 8 is fixed in the recessed portion 71A of the bearing fixing portion 71 to rotatably support an end portion 90A of the rotary shaft 90 of the rotor 9 with the second end bracket 7 attached to the stator core 3.

The cylindrical peripheral wall portion 72 includes a cylindrical wall portion 72A extending toward the stator core 3 from an outer peripheral portion 70C of the bearing fixing portion 71, and an outer end surface 72B located on the outer periphery of the wall portion 72A to form the step d2 between the outer end surface 72B and the wall portion 72A. In this embodiment, the entirety (wall portion 72A) of the cylindrical peripheral wall portion 72 forms the annular positioning projecting portion 74 to be fitted with the annular positioning stepped portion 36 of the stator core 3.

The flange portion 73 is formed at the outer peripheral portion 70C of the cylindrical peripheral wall portion 72. The profile of the flange portion 73 coincides with the profile of the first end bracket 5 discussed above (see FIG. 1B). Screw holes 75 (having the same shape as the four screw holes 55 of the first end bracket 5 discussed above) are formed at four corners of the flange portion 73. The screw holes 75 correspond to the four screw holes 39 formed in the second end portion 32 of the stator core 3. The second end bracket 7 is attached to the stator core 3 by inserting screws (not shown) into the four screw holes 39 provided in the second end portion 32 of the stator core 3 and the four screw holes 75 provided in the flange portion 73 with the flange portion 73 contacting the second end portion 32 of the stator core 3.

The rotor 9 includes the rotary shaft 90, two rotor stacks 91 and 92 fixed to the rotary shaft 90, and permanent magnets 93 disposed between the rotor stacks 91 and 92. The rotor 9 is configured such that the rotor stacks 91 and 92 rotate in the through hole 30 of the stator core 3 with the rotary shaft 90 rotatably supported by the bearing 6 held by the first end bracket 5 and the bearing 8 held by the second end bracket 7.

Figure 3A:
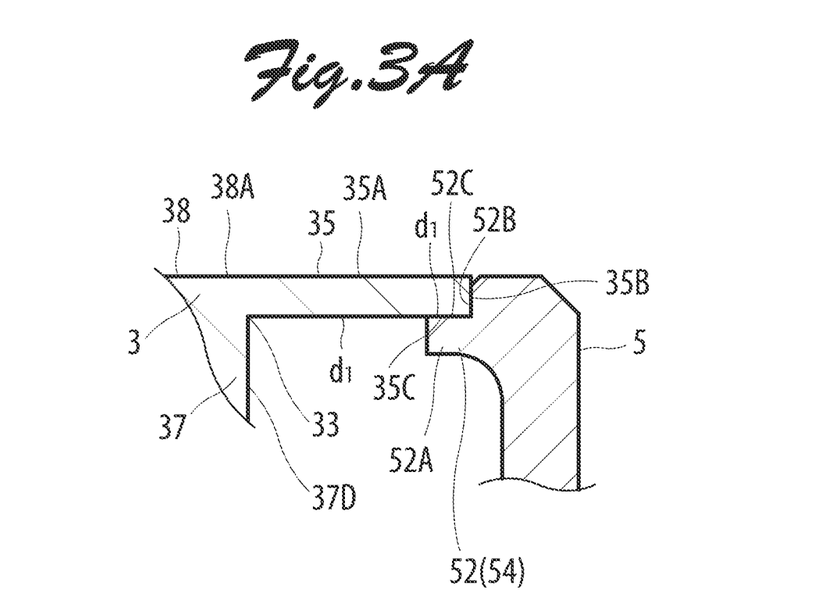
FIGS. 3A and 3B are enlarged views each showing a fitting structure of the electric apparatus of FIGS. 1A and 1B.

FIG. 3A is an enlarged view showing a fitting structure formed between the first end portion 31 of the stator core 3 and the first end bracket 5. As shown in FIG. 3A, the annular positioning stepped portion 35 of the stator core 3 and the annular positioning projecting portion 54 of the first end bracket 5 are entirely fitted with each other with the first end bracket 5 attached to the stator core 3. Specifically, as shown in FIG. 3A, a fitting structure is formed between the annular positioning stepped portion 35 of the stator core 3 and the annular positioning projecting portion 54 of the first end bracket 5 by bringing the outer end surface 52B of the cylindrical peripheral wall portion 52 forming the annular positioning projecting portion 54 into contact with an end surface 35B of an end portion 35A of the annular positioning stepped portion 35 of the stator core 3, and bringing an outer peripheral surface 52C of the wall portion 52A into contact with an inner peripheral surface 35C of the end portion 35A of the annular positioning stepped portion 35. With such a fitting structure, respective surfaces of the annular positioning stepped portion 35 and the annular positioning projecting portion 54 contact each other in the radial direction. That is, the inner peripheral surface 35C of the end portion 35A of the annular positioning stepped portion 35 and the outer peripheral surface 52C of the cylindrical peripheral wall portion 52 contact each other with the end surface 35B of the end portion 35A of the annular positioning stepped portion 35 contacting the outer end surface 52B of the cylindrical peripheral wall portion 52. The contact surfaces thus defined are cylindrical surfaces. This facilitates positioning between the stator core 3 and the first end bracket 5 when attaching the first end bracket 5 to the first end portion of the stator core 3, thereby accordingly facilitating attachment of the first end bracket 5 to the stator core 3. Further, if the annular positioning stepped portion 35 of the stator core 3 and the annular positioning projecting portion 54 of the first end bracket 5 are fitted with each other over such cylindrical surfaces, the first end bracket 5 can be positioned with respect to the stator core 3 with increased accuracy.

After the first end bracket 5 is attached to the first end portion 31 of the stator core 3, any part of the first end bracket 5 does not contact internal structural members (magnetic pole portions 37) of the stator core 3. Therefore, torque of the stepping motor can be increased, compared to the related art, by an amount corresponding to an increase in area of the surface over which the stator core 3 (magnetic pole portions 37) and the rotor 9 face each other. In addition, the surfaces (cylindrical surfaces) of contact between the first end portion 31 of the stator core 3 and the first end bracket 5 allow the stator core 3 and the first end bracket 5 to contact each other over a large area, thereby increasing the rigidity between the stator core 3 and the first end bracket 5. Further, a gap between the first end portion 31 of the stator core 3 and the first end bracket 5 can be narrowed, thereby reducing vibration and noise produced between the stator core 3 and the first end bracket 5.

Figure 3B:
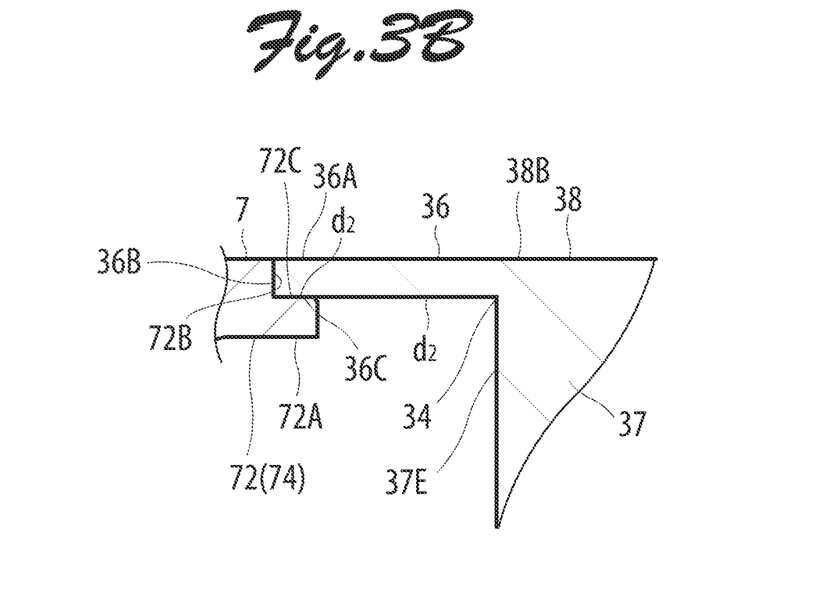

FIG. 3B is an enlarged view showing a fitting structure formed between the second end portion 32 of the stator core 3 and the second end bracket 7. As shown in FIG. 3B, the annular positioning stepped portion 36 of the stator core 3 and the annular positioning projecting portion 74 of the second end bracket 7 are entirely fitted with each other with the second end bracket 7 attached to the stator core 3. Specifically, as shown in FIG. 3B, a fitting structure is formed between the annular positioning stepped portion 36 of the stator core 3 and the annular positioning projecting portion 74 of the second end bracket 7 by bringing the outer end surface 72B of the cylindrical peripheral wall portion 72 forming the annular positioning projecting portion 74 into contact with an end surface 36B of an end portion 36A of the annular positioning stepped portion 36 of the stator core 3, and bringing an outer peripheral surface 72C of the wall portion 72A into contact with an inner peripheral surface 36C of the end portion 36A of the annular positioning stepped portion 36. With the fitting structure shown in FIG. 3B, respective surfaces of the annular positioning stepped portion 36 and the annular positioning projecting portion 74 contact each other in the radial direction. That is, the inner peripheral surface 36C of the end portion 36A of the annular positioning stepped portion 36 and the outer peripheral surface 72C of the cylindrical peripheral wall portion 72 contact each other with the end surface 36B of the end portion 36A of the annular positioning stepped portion 36 contacting the outer end surface 72B of the cylindrical peripheral wall portion 72. The contact surfaces thus defined are cylindrical surfaces. This facilitates positioning between the stator core 3 and the second end bracket 7 when attaching the second end bracket 7 to the second end portion 32 of the stator core 3, thereby accordingly facilitating attachment of the second end bracket 7 to the stator core 3. Further, if the annular positioning stepped portion 36 of the stator core 3 and the annular positioning projecting portion 74 of the second end bracket 7 are fitted with each other over such cylindrical surfaces, the second end bracket 7 can be positioned with respect to the stator core 3 with increased accuracy.

After the second end bracket 7 is attached to the second end portion 32 of the stator core 3, any part of the second end bracket 7 does not contact internal structural members (magnetic pole portions 37) of the stator core 3. Therefore, torque of the stepping motor can be increased, compared to the related art, by an amount corresponding to an increase in area of the surface over which the stator core 3 (magnetic pole portions 37) and the rotor 9 face each other. In addition, the surfaces (cylindrical surfaces) of contact between the second end portion 32 of the stator core 3 and the second end bracket 7 allow the stator core 3 and the second end bracket 7 to contact each other over a large area, thereby increasing the rigidity between the stator core 3 and the second end bracket 5. Further, a gap between the second end portion 32 of the stator core 3 and the second end bracket 7 can be narrowed, thereby reducing vibration and noise produced between the stator core 3 and the second end bracket 7.

Figure 4:
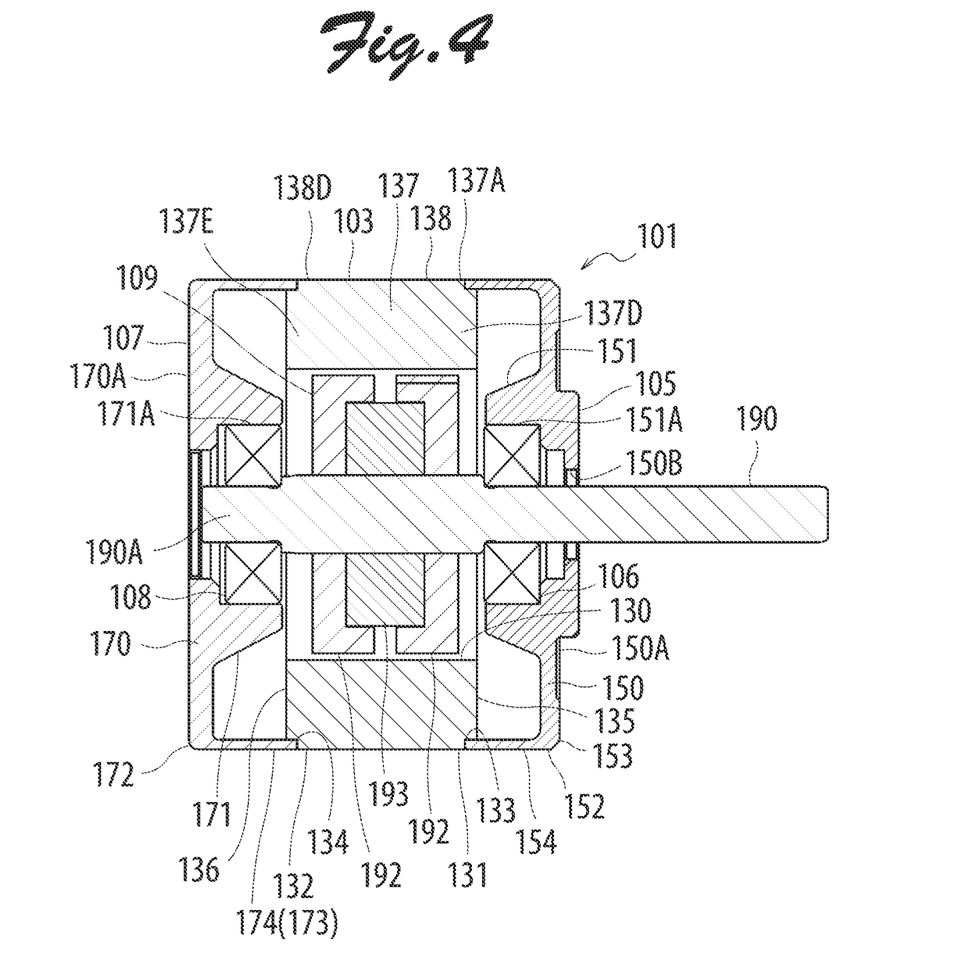
FIG. 4 is a cross-sectional view showing an electric apparatus according to a second embodiment of the present invention.
Figure 5:
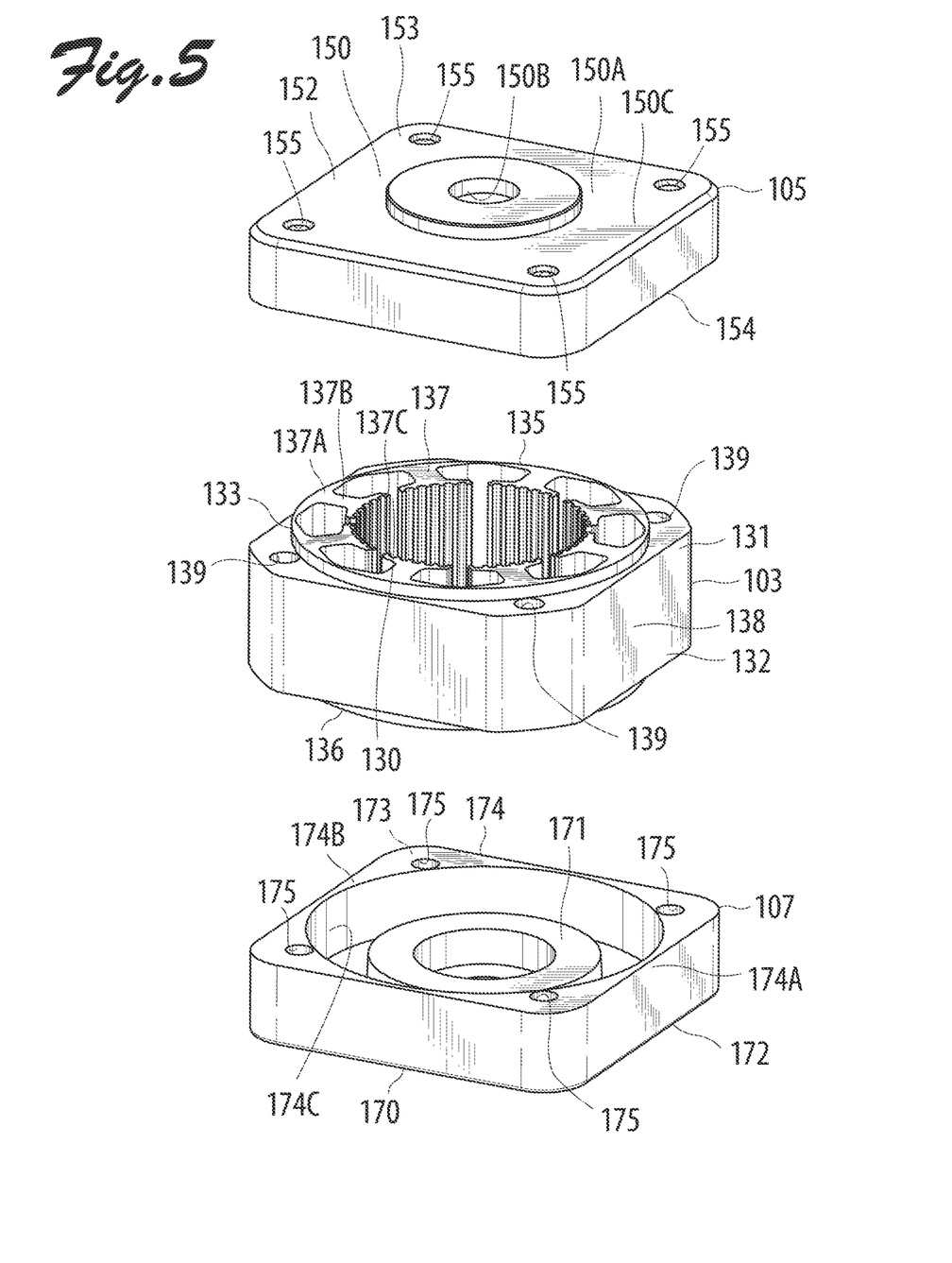
FIG. 5 is a perspective view as the electric apparatus of FIG. 4 is partially exploded.
Figure 6A:
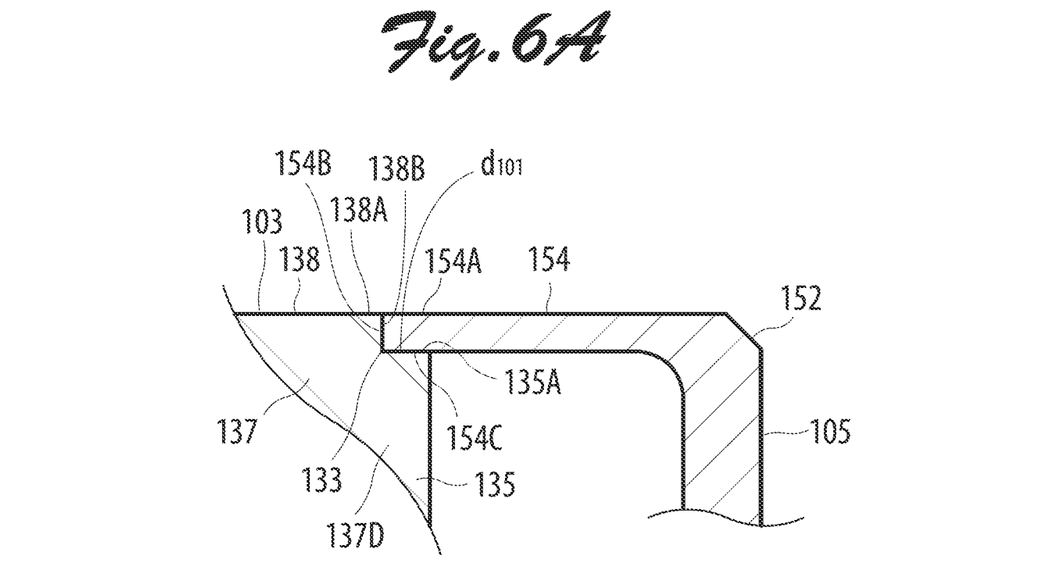
FIGS. 6A and 6B are enlarged views each showing a fitting structure of the electric apparatus of FIG. 4.
Figure 6B:
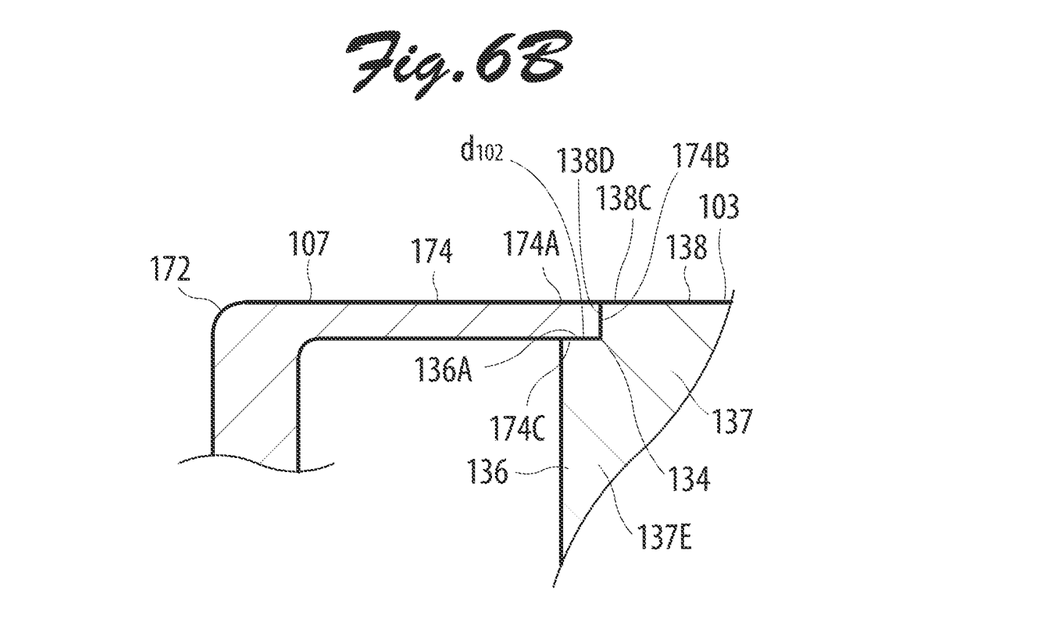

FIG. 4 is a cross-sectional view showing a stepping motor according to a second embodiment of the present invention. FIG. 5 is a perspective view showing some exploded parts (a stator core and a pair of end brackets) of the stepping motor of FIG. 4. FIGS. 6A and 6B are enlarged views of a fitting structure formed between the stator core and the pair of end brackets of the stepping motor of this embodiment. Components of the stepping motor shown in FIGS. 4 to 6 that are common to those of the stepping motor of the first embodiment (stepping motor 1) discussed above are denoted by reference numerals defined by adding 100 to the reference numerals affixed to their counterparts in FIGS. 1 to 3 and descriptions thereof are omitted.

As shown in FIGS. 4 and 5, annular positioning projecting portions 135 and 136 are formed at outer peripheral corner portions 133 and 134, respectively, of a stator core 103 to extend over the entire outer circumference of the stator core 103. The annular positioning projecting portions 135 and 136 are formed by stacking magnetic steel sheets which are shaped differently from magnetic steel sheets forming a main portion of the stator core 103 (magnetic pole portions 137 and a yoke 138 of the stator core 103 shown in FIG. 5. By separately stacking such differently shaped magnetic steel sheets, the magnetic pole portions 137 and the yoke 138 are integrally formed. Then, the annular positioning projecting portion 135 is formed at respective first end portions 137D of the magnetic pole portions 137 such that a step d101 is formed between the annular positioning projecting portion 135 and a first end portion 138A of the yoke 138. Further, the annular positioning projecting portion 136 is formed at respective second end portions 137E of the magnetic pole portions 137 such that a step d102 is formed between the annular positioning projecting portion 136 and a second end portion 138C of the yoke 138.

A first end bracket 105 of the pair of end brackets includes an annular positioning stepped portion 154 in place of the cylindrical peripheral wall portion 52 (annular positioning projecting portion 54) of the first end bracket 5 discussed above. The annular positioning stepped portion 154 is formed at an outer peripheral corner portion 152 of a bearing fixing portion 151. The profile of the annular positioning stepped portion 154 as seen in a direction in which the stator core 103 and the first end bracket 105 face each other coincides with the profile of the first end bracket 105 (see FIG. 1B). The annular positioning stepped portion 154 works as a flange portion 153 when the first end bracket 105 is attached to the stator core 103.

A second end bracket 107 of the pair of end brackets includes an annular positioning stepped portion 174 in place of the cylindrical peripheral wall portion 72 (annular positioning projecting portion 74) of the second end bracket 7 discussed above. The annular positioning stepped portion 174 is formed at an outer peripheral corner portion 172 of a bearing fixing portion 171. The profile of the annular positioning stepped portion 174 as seen in a direction in which the stator core 103 and the second end bracket 107 face each other coincides with the profile of the second end bracket 107 (see FIG. 1B). The annular positioning stepped portion 174 also works as a flange portion 173 when the second end bracket 107 is attached to the stator core 103.

In the stepping motor 101, the annular positioning projecting portion 135 of the stator core 103 and the annular positioning stepped portion 154 of the first end bracket 105 are entirely fitted with each other with the first end bracket 105 attached to the stator core 103. Specifically, as shown in FIG. 6A, a fitting structure is formed between the annular positioning projecting portion 135 of the stator core 103 and the annular positioning stepped portion 154 of the first end bracket 105 by bringing an end surface 154B of an end portion 154A of the annular positioning stepped portion 154 into contact with an end surface 138B of the first end portion 138A of the yoke 138 of the stator core 103, and bringing an inner peripheral surface 154C of the end portion 154A of the annular positioning stepped portion 154 into contact with an outer peripheral surface 135A of the annular positioning projecting portion 135. Also with the fitting structure of the stepping motor 101, respective surfaces of the annular positioning stepped portion 154 and the annular positioning projecting portion 135 contact each other in the radial direction. That is, the outer peripheral surface 135A of the annular positioning projecting portion 135 and the inner peripheral surface 154C of the end portion 154A of the annular positioning stepped portion 154 contact each other with the end surface 154B of the end portion 154A of the annular positioning stepped portion 154 contacting the end surface 138B of the first end portion 138A of the yoke 138. The contact surfaces thus defined are cylindrical surfaces. This facilitates positioning between the stator core 103 and the first end bracket 105 when attaching the first end bracket 105 to a first end portion 131 of the stator core 103, thereby accordingly facilitating attachment of the first end bracket 105 to the stator core 103. Further, if the annular positioning projecting portion 135 of the stator core 103 and the annular positioning stepped portion 154 of the first end bracket 105 are fitted with each other over such cylindrical surfaces, the first end bracket 105 can be positioned with respect to the stator core 103 with increased accuracy.

After the first end bracket 105 is attached to the first end portion 131 of the stator core 103, any part of the first end bracket 105 does not contact internal structural members (magnetic pole portions 137) of the stator core 103. Therefore, torque of the stepping motor can be increased, compared to the related art, by an amount corresponding to an increase in area of the surface over which the stator core 103 (magnetic pole portions 137) and the rotor 109 face each other. In addition, the surfaces (cylindrical surfaces) of contact between the first end portion 131 of the stator core 103 and the first end bracket 105 allow the stator core 103 and the first end bracket 105 to contact each other over a large area, thereby increasing the rigidity between the stator core 103 and the first end bracket 105. Further, a gap between the first end portion 131 of the stator core 103 and the first end bracket 105 can be narrowed, thereby reducing vibration and noise produced between the stator core 103 and the first end bracket 105.

Further, in the stepping motor 101, the annular positioning projecting portion 136 of the stator core 103 and the annular positioning stepped portion 174 of the second end bracket 107 are entirely fitted with each other with the second end bracket 107 attached to the stator core 103. Specifically, as shown in FIG. 6B, a fitting structure is formed between the annular positioning projecting portion 136 of the stator core 103 and the annular positioning stepped portion 174 of the second end bracket 107 by bringing an end surface 174B of an end portion 174A of the annular positioning stepped portion 174 into contact with an end surface 138D of the second end portion 138C of the yoke 138 of the stator core 103, and bringing an inner peripheral surface 174C of the end portion 174A of the annular positioning stepped portion 174 into contact with an outer peripheral surface 136A of the annular positioning projecting portion 136. Also with the fitting structure of the stepping motor 101, respective surfaces of the annular positioning stepped portion 174 and the annular positioning projecting portion 136 contact each other in the radial direction. That is, the outer peripheral surface 136A of the annular positioning projecting portion 136 and the inner peripheral surface 174C of the end portion 174A of the annular positioning stepped portion 174 contact each other with the end surface 174B of the end portion 174A of the annular positioning stepped portion 174 contacting the end surface 138D of the second end portion 138C of the yoke 138. The contact surfaces thus defined are cylindrical surfaces. This facilitates positioning between the stator core 103 and the second end bracket 107 when attaching the second end bracket 107 to a second end portion 132 of the stator core 103, thereby accordingly facilitating attachment of the second end bracket 107 to the stator core 103. Further, if the annular positioning projecting portion 136 of the stator core 103 and the annular positioning stepped portion 174 of the second end bracket 107 are fitted with each other over such cylindrical surfaces, the second end bracket 107 can be positioned with respect to the stator core 103 with increased accuracy.

After the second end bracket 107 is attached to the second end portion 132 of the stator core 103, any part of the second end bracket 107 does not contact internal structural members (magnetic pole portions 137) of the stator core 103. Therefore, torque of the stepping motor can be increased, compared to the related art, by an amount corresponding to an increase in area of the surface over which the stator core 103 (magnetic pole portions 37) and the rotor 109 face each other. In addition, the surfaces (cylindrical surfaces) of contact between the second end portion 132 of the stator core 103 and the second end bracket 107 allow the stator core 103 and the second end bracket 107 to contact each other over a large area, thereby increasing the rigidity between the stator core 103 and the second end bracket 107. Further, vibration produced in the stepping motor 101 is propagated evenly in the circumferential direction between the second end portion 132 of the stator core 103 and the second end bracket 107 via the surface (cylindrical surface) of contact between the annular positioning projecting portion 136 of the stator core 103 and the annular positioning stepped portion 174 of the second end bracket 107. Therefore, a gap between the second end portion 132 of the stator core 103 and the second end bracket 107 can be narrowed, thereby reducing vibration and noise produced between the stator core 103 and the second end bracket 107.

Two embodiments of the electric apparatus according to the present invention are described so far. In the first embodiment (stepping motor 1), annular positioning stepped portions (annular positioning stepped portions 35 and 36) are provided at both the end portions 31 and 32 of the stator core 3 and annular positioning projecting portions (annular positioning projecting portions 54 and 74) are provided at both the pair of end brackets 5 and 7. In the second embodiment (stepping motor 101), annular positioning projecting portions 135 and 136 are provided at both the end portions 131 and 132 of the stator core 103 and annular positioning projecting portions (annular positioning projecting portions 154 and 174) are provided at the pair of end brackets 105 and 107. However, embodiments of the electric apparatus according to the present invention (combinations of annular positioning stepped portions and annular positioning projecting portions that form a fitting structure) are not limited to the stepping motors 1 and 101. That is, an annular positioning stepped portion may be provided at the first end portion of the stator core, an annular positioning projecting portion may be provided at the second end portion of the stator core, an annular positioning projecting portion may be provided at the first end bracket, and an annular positioning stepped portion may be provided at the second end bracket. Alternatively, an annular positioning projecting portion may be provided at the first end portion of the stator core, an annular positioning stepped portion may be provided at the second end portion of the stator core, an annular positioning stepped portion may be provided at the first end bracket, and an annular positioning projecting portion may be provided at the second end bracket.

In the embodiments of the present invention, a stepping motor, which is a sort of a rotary electric machine, is used as a specific example of the electric apparatus. However, it is a matter of course that the present invention may be applied to other electric apparatuses such as a linear motor, an electric generator, and a resolver as long as an end bracket is attached to an end portion of a stator core.

In the present invention, one of an annular positioning stepped portion and an annular positioning projecting portion is formed at an outer peripheral corner portion of an end portion of a stator core to extend entirely circumferentially of the stator core, and the other of the annular positioning stepped portion and the annular positioning projecting portion is formed at an end bracket to be entirely fitted with the one of the annular positioning stepped portion and the annular positioning projecting portion. Therefore, it is possible to enhance the performance of an electric apparatus and to increase the rigidity of the electric apparatus.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. An electric apparatus including a stator core and an end bracket fitted with an end portion of the stator core wherein:
   one of an annular positioning stepped portion and an annular positioning projecting portion is formed at an outer peripheral corner portion of the end portion of the stator core to extend entirely circumferentially of the stator core; and
   the other of the annular positioning stepped portion and the annular positioning projecting portion is formed at the end bracket to be entirely fitted with the one of the annular positioning stepped portion and the annular positioning projecting portion.

2. The electric apparatus according to claim 1, wherein:
   the annular positioning stepped portion is formed at the outer peripheral corner portion of the end portion of the stator core; and
   the end bracket includes a bearing fixing portion and a cylindrical peripheral wall portion extending toward the stator core from an outer peripheral portion of the bearing fixing portion, and a distal end portion of the cylindrical peripheral wall portion forms the annular positioning projecting portion.

3. The electric apparatus according to claim 1, wherein:
   the annular positioning projecting portion is formed at the outer peripheral corner portion of the end portion of the stator core; and
   the end bracket includes a bearing fixing portion, and the annular positioning stepped portion is formed at an outer peripheral corner portion of the bearing fixing portion.

4. The electric apparatus according to claim 1, wherein:
   the stator core is formed by stacking a plurality of magnetic steel sheets; and
   the annular positioning stepped portion or the annular positioning projecting portion provided in the stator core is formed by stacking magnetic steel sheets which are shaped differently from magnetic steel sheets forming a main portion of the stator core.

5. The electric apparatus according to claim 1, wherein respective surfaces of the annular positioning stepped portion and the annular positioning projecting portion that contact each other in a radial direction are cylindrical surfaces.

6. A rotary electric machine comprising:
   a stator core;
   a rotor having a rotary shaft and configured to rotate inside the stator core; and
   a pair of end brackets fitted with both end portions of the stator core to hold bearings for supporting the rotary shaft, wherein:
   one of an annular positioning stepped portion and an annular positioning projecting portion is formed at an outer peripheral corner portion of each of the end portions of the stator core to extend entirely circumferentially of the stator core; and
   the other of the annular positioning stepped portion and the annular positioning projecting portion is formed at each of the pair of end brackets to be entirely fitted with the one of the annular positioning stepped portion and the annular positioning projecting portion.

7. The electric apparatus according to claim 2, wherein respective surfaces of the annular positioning stepped portion and the annular positioning projecting portion that contact each other in a radial direction are cylindrical surfaces.

8. The electric apparatus according to claim 3, wherein respective surfaces of the annular positioning stepped portion and the annular positioning projecting portion that contact each other in a radial direction are cylindrical surfaces.

9. The electric apparatus according to claim 4, wherein respective surfaces of the annular positioning stepped portion and the annular positioning projecting portion that contact each other in a radial direction are cylindrical surfaces.

* * * * *